(12) United States Patent
Green et al.

(10) Patent No.: US 7,211,966 B2
(45) Date of Patent: May 1, 2007

(54) FLUORESCENT BALLAST CONTROLLER IC

(75) Inventors: Peter Green, Redondo Beach, CA (US); Zan Huang, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/178,982

(22) Filed: Jul. 11, 2005

(65) Prior Publication Data

US 2006/0006811 A1    Jan. 12, 2006

Related U.S. Application Data

(60) Provisional application No. 60/626,233, filed on Nov. 8, 2004, provisional application No. 60/587,674, filed on Jul. 12, 2004.

(51) Int. Cl.
*H05B 37/02* (2006.01)
*H05B 41/24* (2006.01)

(52) U.S. Cl. .................. 315/224; 315/247; 315/287; 315/DIG. 4

(58) Field of Classification Search ............ 315/209 R, 315/210–212, 219, 224–226, 246, 247, 254, 315/276, 283, 287, 291, 299, 307, 320, 324, 315/DIG. 4, DIG. 5, DIG. 7
See application file for complete search history.

(56) References Cited

U.S. PATENT DOCUMENTS

| | | | | |
|---|---|---|---|---|
| 5,583,402 A | * | 12/1996 | Moisin et al. | 315/307 |
| 5,933,340 A | * | 8/1999 | Adamson | 363/97 |
| 6,771,029 B2 | | 8/2004 | Ribarich | 315/292 |
| 6,977,472 B2 | * | 12/2005 | Matsubayashi et al. | 315/291 |
| 6,998,792 B2 | * | 2/2006 | Takahashi et al. | 315/248 |
| 7,042,170 B2 | * | 5/2006 | Vakil et al. | 315/291 |

* cited by examiner

*Primary Examiner*—Thuy Vinh Tran
(74) *Attorney, Agent, or Firm*—Ostrolenk, Faber, Gerb & Soffen, LLP

(57) ABSTRACT

A ballast control integrated circuit for driving at least one gas discharge lamp comprising a first oscillator circuit for producing a first oscillating signal; a driver circuit for driving first and second output transistors connected in a half bridge configuration; the driver circuit being provided with pulsed signals derived from the first oscillating signal for generating pulsed drive signals for driving the first and second transistors; and a dimming control circuit responsive to a dimming input signal to drive the driver circuit such that the driver circuit provides the pulsed drive signals in bursts thereby to dim the lamp in dependence on the level of the dimming input signal. The ballast control integrated circuit also provides overcurrent and overvoltage sensing and allows master/slave operation.

19 Claims, 10 Drawing Sheets

FLUORESCENT BALLAST CONTROLLER IC

CROSS-REFERENCE TO RELATED APPLICATIONS

The present invention claims the benefit and priority of U.S. Provisional Application Nos. 60/587,674 filed Jul. 12, 2004 and 60/626,233 filed Nov. 8, 2004 and both entitled CCFL/EEFL BALLAST CONTROLLER IC, the entire disclosures of which are hereby incorporated by reference.

BACKGROUND OF THE INVENTION

The present invention relates to flourescent lamp ballasts and more particularly, to a ballast controller for CCFL/EEFL (cold cathode flourescent lamps and external electrode flourescent lamps) which are typically used in back lighting applications for display devices, for example LCD displays and LCD televisions. Even more particularly, the present invention relates to a ballast controller integrated circuit for such lamps.

SUMMARY OF THE INVENTION

The present invention relates to an electronic ballast for fluorescent lamps, in particular CCFL and EEFL lamps, which provides full control functionality including a programmable ignition ramp and supports dimming via an analog or PWM control voltage. In one embodiment, a high voltage half bridge driver is integrated into the integrated circuit and in another embodiment, a high voltage full bridge driver circuit is provided. The present invention provides an electronic ballast which is designed particularly for CCFL/EEFL back lighting applications, for example, and provides comprehensive overcurrent and overvoltage protection for these applications, as well as a master/slave connection enabling the ballast circuit to be synchronized with other ballast circuits for operation of a large number of lamps.

According to one aspect, the invention comprises a ballast control integrated circuit for driving at least one gas discharge lamp comprising a first oscillator circuit for producing a first oscillating signal; a driver circuit for driving first and second output transistors connected in a half bridge configuration; the driver circuit being provided with pulsed signals derived from said first oscillating signal for generating pulsed drive signals for driving said first and second transistors; and a dimming control circuit responsive to a dimming input signal to drive said driver circuit such that said driver circuit provides said pulsed drive signals in bursts thereby to dim said lamp in dependence on the level of said dimming input signal.

According to another aspect, the invention comprises a ballast control integrated circuit of a first ballast circuit for driving at least one gas discharge lamp comprising a first oscillator circuit for producing a first oscillating signal; a driver circuit for driving first and second output transistors connected in a half bridge configuration; the driver circuit being provided with pulsed signals derived from said first oscillating signal for generating pulsed drive signals for driving said first and second output transistors; and a mode input responsive to a mode signal for determining if said integrated circuit operates as a master or a slave circuit whereby, in a first mode, said first oscillator circuit is activated and produces said first oscillating signal for driving said driver circuit and produces an output signal capable of driving at least one other ballast circuit such that output transistor switching transitions in the at least one other ballast circuit are synchronized with output transistor switching transitions of the first ballast circuit, and, whereby in a second mode, said first ballast circuit operates as a slave, whereby the first oscillator circuit is deactivated and said driver circuit is responsive to an oscillating signal from another ballast circuit such that the output transistor switching transitions of said first ballast circuit are synchronized with the output transistor switching transitions of said other ballast circuit.

According to yet another aspect, the invention comprises a ballast control integrated circuit for driving at least one gas discharge lamp comprising a first oscillator circuit for producing a first oscillating signal; a driver circuit for driving first and second output transistors connected in a half bridge configuration; the driver circuit being provided with pulsed signals derived from said first oscillating signal for generating pulsed drive signals for driving said first and second transistors; further comprising a shut down circuit responsive to a voltage feedback signal from an output circuit comprising said at least one lamp, the voltage feedback signal being related to a voltage across said at least one lamp, and wherein, if said voltage exceeds a threshold, said shutdown circuit disables said driver circuit from providing said pulsed drive signals, further comprising a timing circuit responsive to said voltage feedback signal whereby said voltage must exceed said threshold for a predetermined time in order to disable said driver circuit from providing said pulsed drive signals.

According to yet still another aspect, the invention comprises a ballast control integrated circuit for driving at least one gas discharge lamp comprising a first oscillator circuit for producing a first oscillating signal; a driver circuit for driving first and second output transistors connected in a half bridge configuration and driving a lamp output circuit including said at least one gas discharge lamp; the driver circuit being provided with pulsed signals derived from said first oscillating signal for generating pulsed drive signals for driving said first and second transistors; further comprising a current sense input whereby if a voltage at the current sense input developed from a current in the lamp output circuit exceeds a threshold, the frequency of said first oscillator circuit is increased to increase the frequency of said pulsed drive signals thereby to reduce the power provided to said lamp output circuit.

Other objects, features and advantages of the invention will be apparent from the following detailed description.

BRIEF DESCRIPTION OF THE DRAWING(S)

The invention will now be described in greater detail in the following detailed description with references to the drawings in which.

DETAILED DESCRIPTION OF PREFERRED EMBODIMENTS OF THE INVENTION

Figure 1:
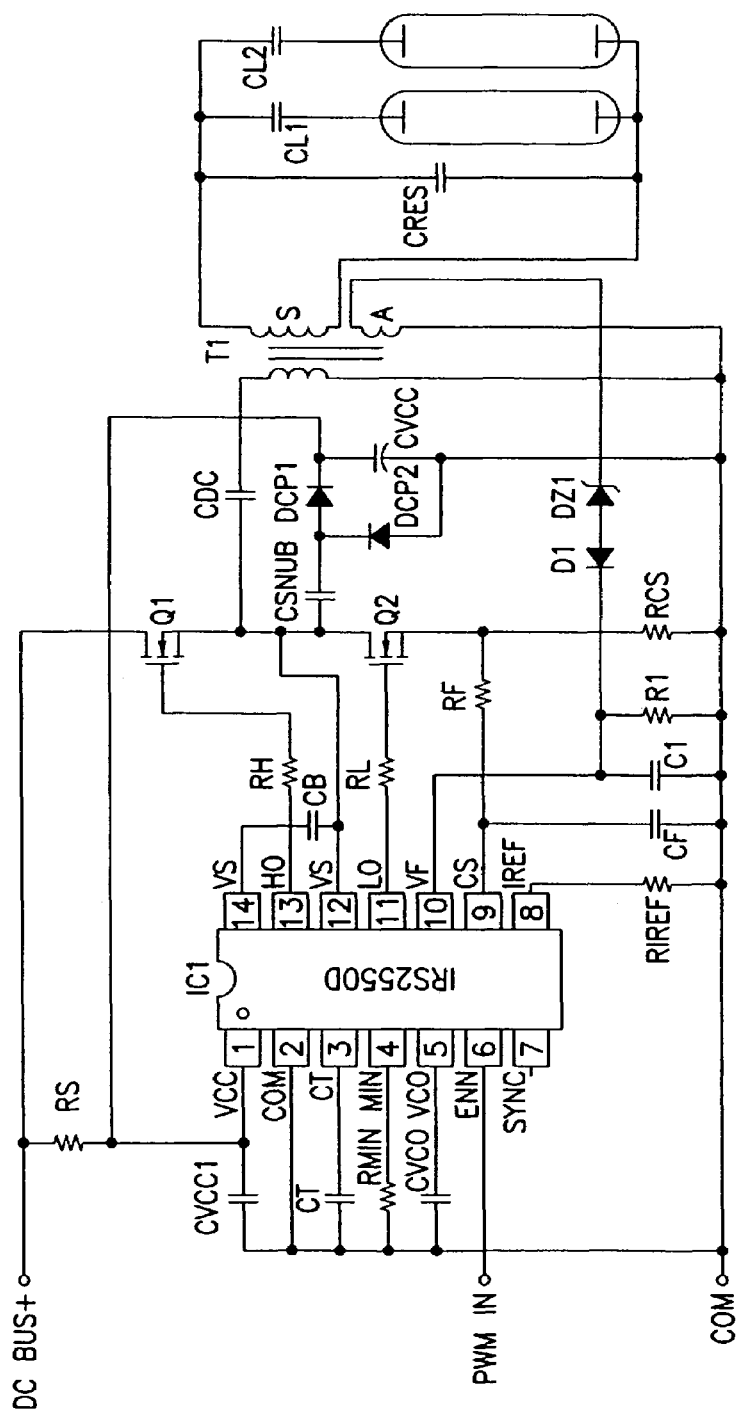
FIG. 1 shows a first embodiment of a circuit employing the integrated circuit of the present invention and incorporating a half bridge driver.

With reference now to the drawings; FIG. 1 shows a first embodiment of the circuit according to the present invention employing the integrated circuit according to the present invention. The integrated circuit IC1 in FIG. 1 incorporates a high voltage half bridge gate driver with a front end that incorporates full control functionality for a CCFL/EEFL ballast. The integrated circuit includes a controlled ignition ramp and supports PWM dimming from a logic level input. Preferably, the integrated circuit is constructed using HVIC (high voltage IC) and latch immune CMOS technologies which enable ruggedized monolithic construction. The output driver features a high pulse current buffer stage designed for minimum driver cross conduction. Noise immunity is achieved with low di/dt peak of the gate drivers and with an undervoltage lockout hysteresis greater than 1 volt. Also incorporated are protection features for overcurrent and overvoltage of the lamps.

Figure 4:
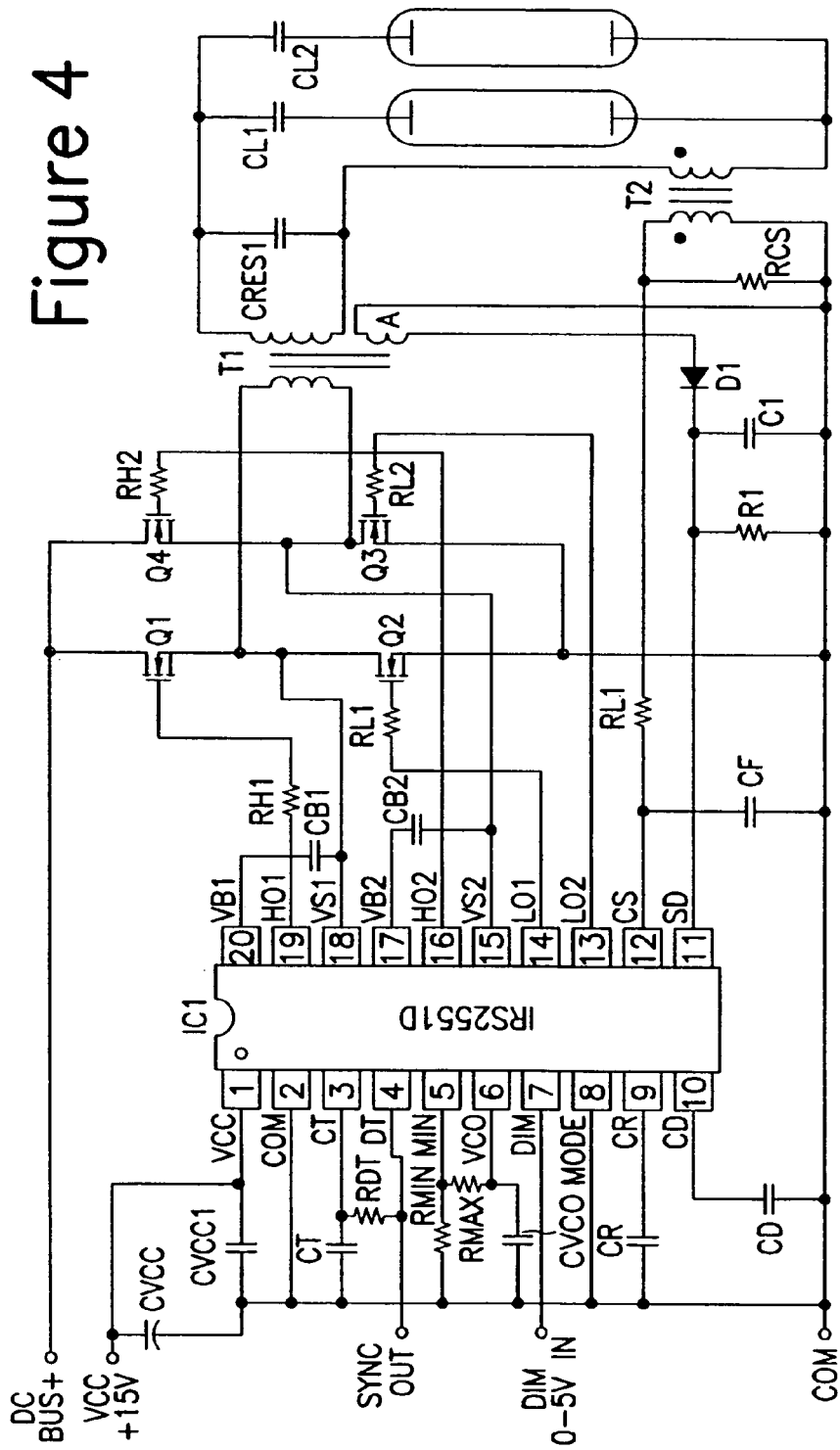
FIG. 4 shows a second embodiment of the circuit according to the present invention incorporating a full bridge with isolated high voltage feedback inputs.
Figure 5:
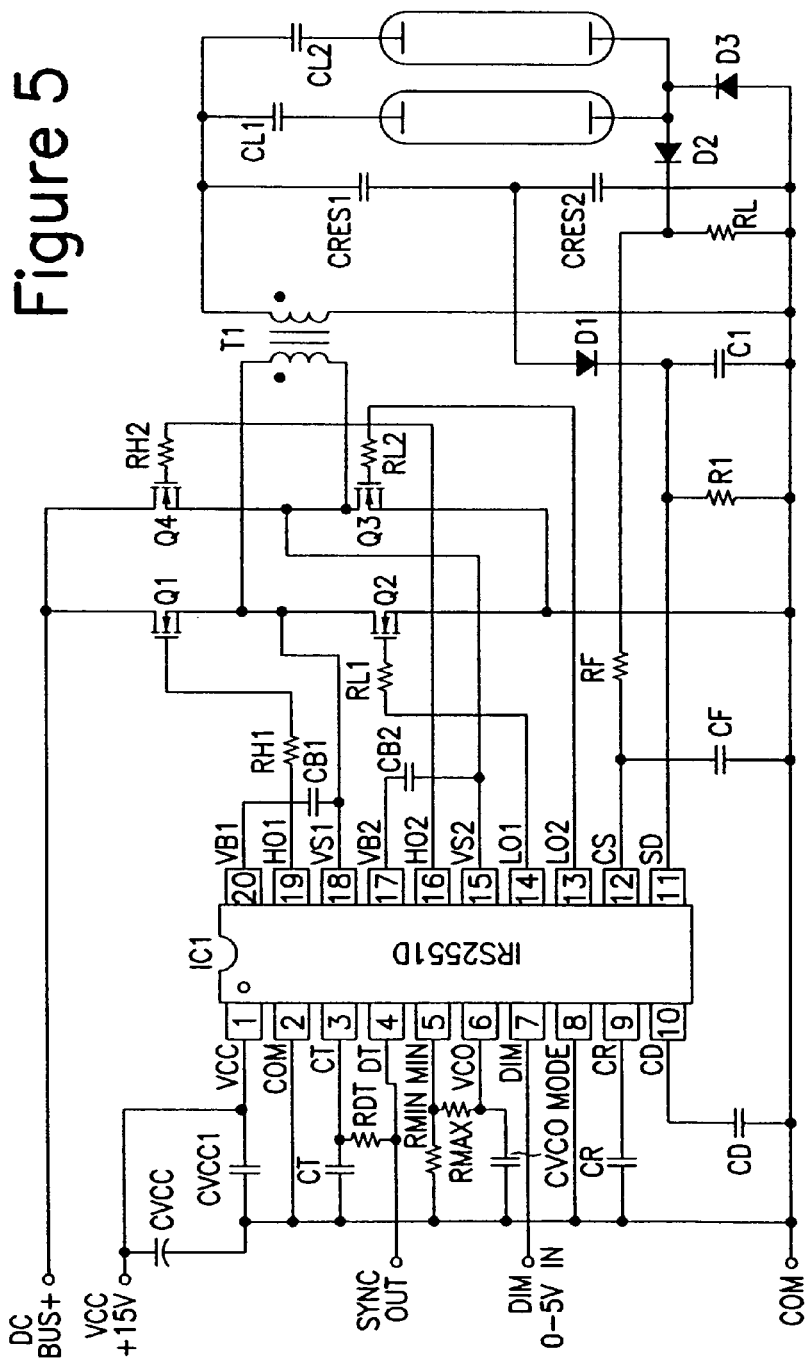
FIG. 5 shows yet another embodiment of the present invention incorporating a full bridge circuit with a low voltage feedback inputs without isolation.

While FIG. 1 shows a half bridge circuit, and the integrated circuit IC1 incorporates a half bridge driver, FIGS. 4 and 5 show implementations utilizing an integrated circuit which incorporates a full bridge driver driving a full bridge circuit as shown. Although differences in the integrated circuits will be pointed out herein, similar technologies are provided for the integrated circuits of FIGS. 4 and 5.

With reference to FIG. 1, integrated circuit IC1 is coupled to power from the high voltage DC bus input which is provided from a suitable rectifier and boost stage, if necessary. The rectifier and boost stage are not shown but are conventional. The rectifier is provided with power typically from the AC main.

IC1 is provided power at terminal Vcc through a dropping resistor Rs and is connected to common (COM) as shown. The integrated circuit has timing components CT and RMIN for establishing the frequency of oscillation of an internal oscillator, to be described in greater detail with reference to FIG. 2. In addition, a voltage controlled oscillator input VCO coupled to a capacitor CVCO for controlling the oscillator frequency is provided. Dimming input controlled by a PWM signal to input ENN is also provided and will be described in greater detail.

The outputs for driving the half bridge transistor Q1 and Q2 are HO and LO as shown. The switching node VS between transistors Q1 and Q2 and which drives the load output circuit including the resonant circuit components and lamps is coupled to the integrated circuit and a bootstrap capacitor CB provides, in known fashion, an increased voltage VB for the high side driver. A current sense input CS is provided which senses the current through the half bridge via a resistor RCS. Further, a current reference is provided at terminal RIREF which is coupled to common via resistor IRREF. In addition, a terminal VF, which will be described in greater herein, provides a voltage feedback from the output circuit. Diodes DCP1 and DCP2 and capacitor CVCC provide charge pumps for the VCC voltage. Capacitors CVCC and CVCC1 provide a filtered VCC voltage for the integrated circuit power.

The output of the switch node between VS the transistors Q1 and Q2 is provided to the resonant output circuit comprising series capacitor CDC and the inductance of transformer T1. Transformer T1 has two secondaries, one secondary S driving the output circuit including one or more CCFL/EEFL lamps, each driven through a series capacitance CL1, CL2 respectively. A resonant capacitor CRES completes the resonant circuit and is coupled across the secondary of transformer T1.

An auxiliary secondary A provides output circuit current feedback to terminal VF of the integrated circuit via rectifier diode D1 and a voltage limiting zener diode DZ2. The circuit of FIG. 1 provides voltage isolation via the secondary of transformer T1 for the integrated circuit.

Resistance RMIN sets the VCO oscillator minimum frequency and the input VCO is the oscillator control voltage for determining the oscillator frequency. Terminal ENN disables the outputs when high at a 5 volt logic level and terminal SYNC, shown not connected in FIG. 1, is a synchronizing output, which will be explained in greater detail later, which can be used to drive other ballast circuits configured in a slave mode. Terminal CT is also used as a synchronizing input, when IC1 is used in slave mode, driven by another ballast circuit. Terminal IREF sets the reference for controlling the lamp running current. Terminal VF provides lamp voltage feedback to provide open circuit anti-arcing protection.

Figure 2:
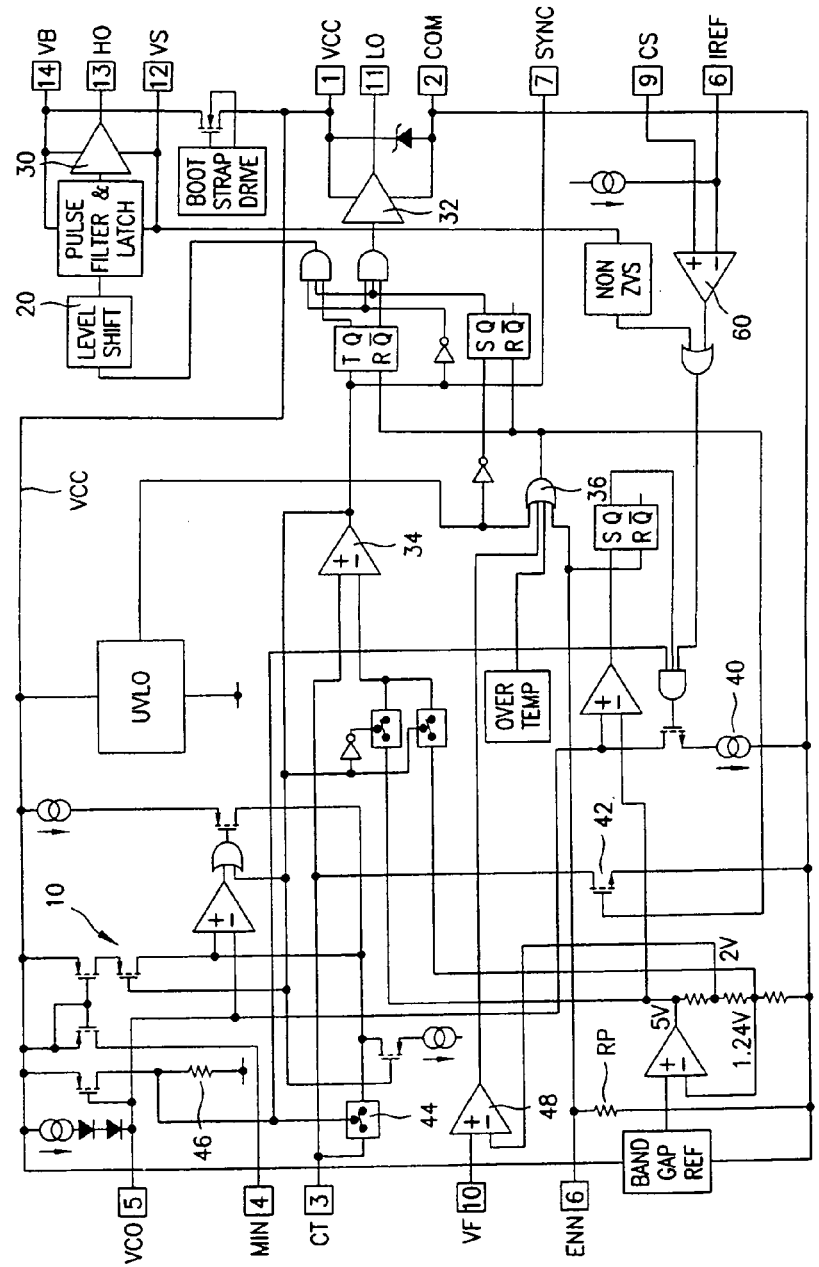
FIG. 2 shows a functional block diagram of the integrated circuit of FIG. 1.

Turning to FIG. 2, this figure shows the functional block diagram of the integrated circuit of FIG. 1. An undervoltage lockout circuit UVLO operates such that it remains in a micro power mode until the voltage at VCC exceeds the UVLO+threshold. When VCC exceeds the UVLO+threshold, the oscillator circuit 10 starts up and gate drive signals are provided at the LO and HO outputs. A level shift circuit 20 is provided for the high side driver 30. The low side driver is shown at 32. The circuit is designed so that the LO output always goes high first on start up. During UVLO and shut down conditions, the voltage at the VCO terminal is held to COM (common). Components UVLO, 36 and 42 enable terminal VCO to be held at COM during these conditions when UVLO issues a UVLO command. This command is released at start up allowing CVCO (FIG. 1) to charge from an internal current source 40. The oscillator frequency is determined by the VCO input voltage so that it is maximum when VCO is at COM and reduces as the voltage at VCO increases reaching a minimum frequency when the voltage at VCO is approximately 5 volts. This creates an ignition ramp required to strike the lamps. RMIN sets the minimum oscillator frequency such that the circuit is designed to have a resonant frequency just below this point. As the VCO pin reaches 5 volts and minimum frequency, a large voltage is developed at the lamp outputs allowing ignition to take place. If the output is open circuit, a very large voltage develops at the output. This is fed back to the VF terminal from auxiliary winding A of the output transformer T1, causing the integrated circuit to latch off immediately. The threshold of the VF terminal is illustratedly 2 volts to allow control from a microcontroller if required.

Terminal ENN also illustratedly has a threshold of 2 volts to allow control from a microcontroller. Terminal ENN enables the circuit to disable the output. However, as will be explained herein, the terminal ENN also supports a dimming function if it is pulse width modulated.

Both terminals VF and ENN are coupled to internal comparators. Internal comparator 48 for terminal VF is shown in FIG. 2.

Dimming is implemented by control of the terminal ENN by analog or PWM voltage control. Terminal ENN is provided with a logic level input. If it is left unconnected, the terminal is internally tied to COM via resistor RP and the integrated circuit is enabled for operation. When the terminal is high, the integrated circuit is disabled. PWM dimming or analog dimming may be employed. When PWM dimming is used, a low frequency pulsed signal is applied to the ENN input. The integrated circuit reignites the lamp each time the ENN input goes low and switches off each time it goes high. The duty cycle of the PWM signal determines the lamp brightness level, that it, 100% PWM gives zero output and 0% gives maximum output. It is necessary for CVCO to charge in a short time relative to the cycle time of the PWM dimming signal in order for the dimming to operate.

Additionally, the current in the half bridge is monitored at the terminal CS so that during operation, if too much power is supplied to the lamps, the integrated circuit is able to compensate by increasing the oscillator frequency, thereby reducing the output current. This prevents the lamps from being overdriven because overdriving these lamps reduces their life. Furthermore, a sync output is provided as described below in more detail to allow additional ballasts to be configured in slave mode to operate from the oscillator of the master ballast allowing realization of a ballast array capable of driving a large number of lamps.

Figure 3:
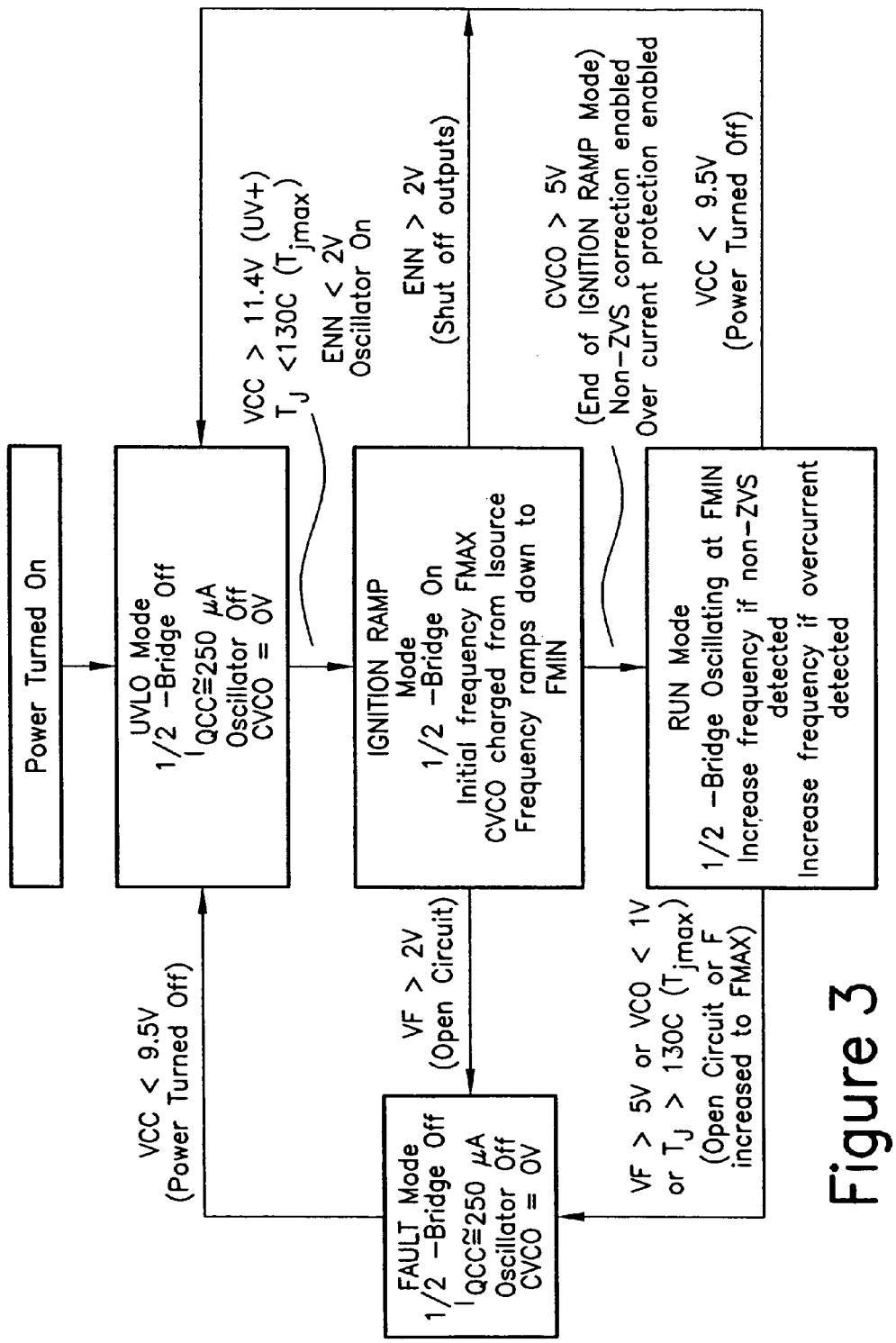
FIG. 3 shows a state diagram for the integrated circuit of FIG. 2.

FIG. 3 shows the state diagram for the integrated circuit of FIGS. 1 and 2. As shown, there are four modes, a UVLO mode, an ignition ramp mode as described, a RUN mode and a FAULT mode. Change between the different modes is as shown in FIG. 3.

FIG. 4 shows another embodiment of the circuit employing an integrated circuit IC1 which incorporates a full bridge driver. As there is additional circuitry in the integrated circuit, an integrated circuit package employing more terminals is necessary. However, the circuit operates in much the same way as the circuit of FIG. 1. It incorporates drivers providing high outputs to both high side switches (Q1 and Q4) and low outputs to both low side switches (Q2 and Q3) as shown. The circuit of FIG. 4 has a dimming input which operates similar to the circuit of FIG. 1. When the dimming input is at 0 volts, the output brightness is maximum. When the dimming input is at 5 volts, the output brightness is minimum. Similarly, it incorporates a voltage controlled oscillator VCO and some additional terminals. Terminal CT is the oscillator timing capacitor input. Terminal DT allows dead time setting and is also the sync output as shown in FIG. 4. This allows master-slave operation of connected ballasts. Terminal MIN, as in FIG. 1, allows setting the oscillator minimum frequency via resistor RMIN. Terminal VCO is the oscillator control voltage. Terminal MODE controls whether the integrated circuit is in a master mode or slave mode. According to the embodiment shown, master mode is provided with an input of 0 volts and slave mode is provided with an input of VCC, in the illustrated embodiment 15 volts. Terminal CR is coupled to a dimming ramp capacitor CR which sets a dimming burst frequency, which will be explained below. Terminal CD is coupled to a shut down delay capacitor CD.

Terminal SD is a shut down input controlled by the auxiliary winding A of transformer T1. Terminal CS is a current sense input which is provided by a current sense transformer T2 in the embodiment shown in FIG. 4 which provides high voltage isolation between the output circuit and the current sense input CS. Terminals VB1 and VB2 are coupled to bootstrap capacitors CB1 and CB2 respectively and provide the high side gate driver floating supplies for the two high side drivers.

FIG. 5 shows another embodiment of a full bridge output circuit but wherein the terminals CS and SD are provided with non-isolated low voltage inputs, in contrast to the circuit of FIG. 4 wherein the auxiliary winding A of the transformer T1 and the transformer T2 provide isolated inputs to these terminals.

Figure 6:
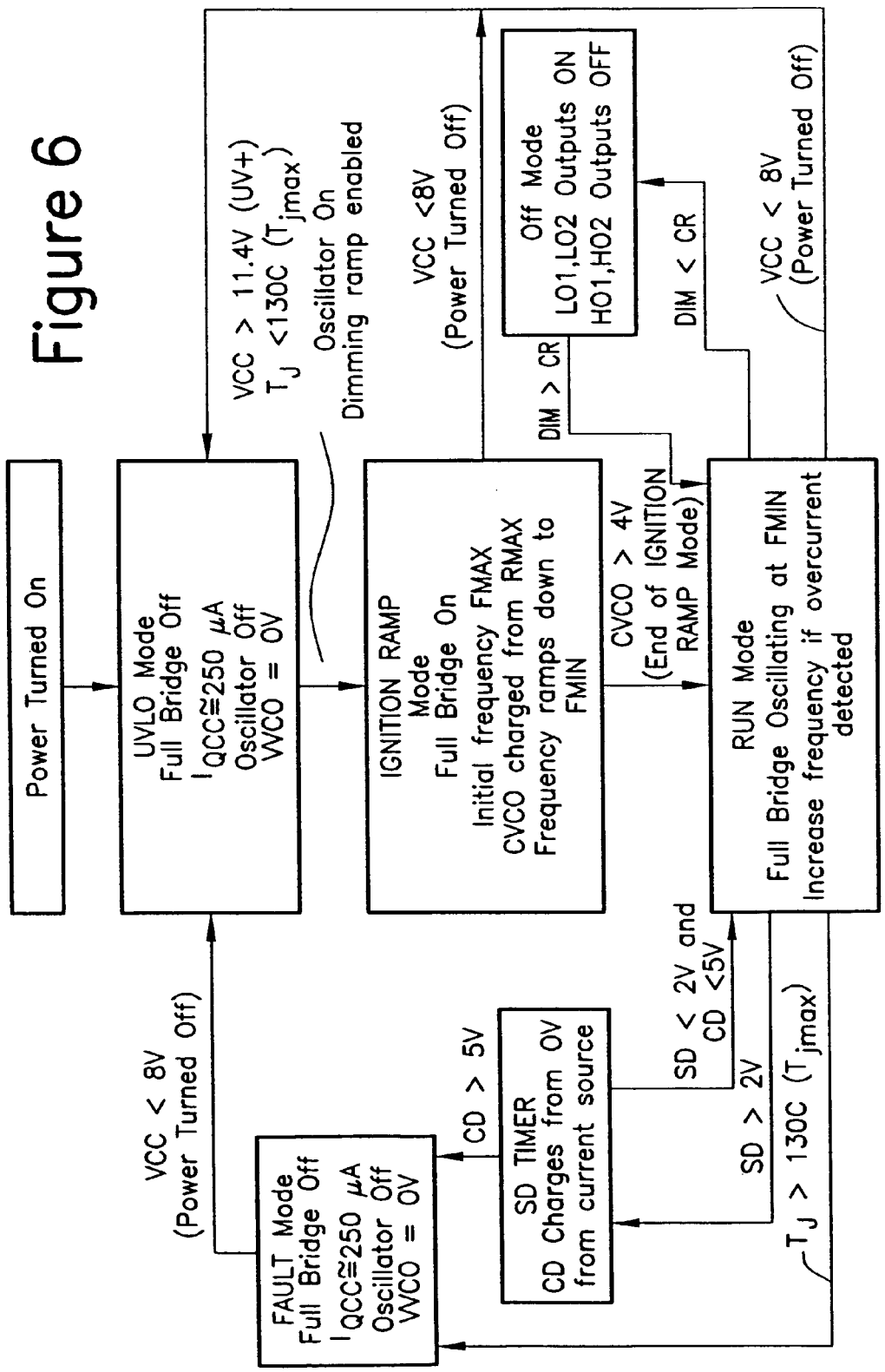
FIG. 6 shows the state diagram for the integrated circuits of FIGS. 4 and 5.

FIG. 6 shows the state diagram for the integrated circuit of FIGS. 4 and 5. As shown, there are six modes, a UVLO mode, a ignition ramp mode, a RUN mode, an OFF mode, an SD or shut down timer mode and a FAULT mode.

Figure 10:
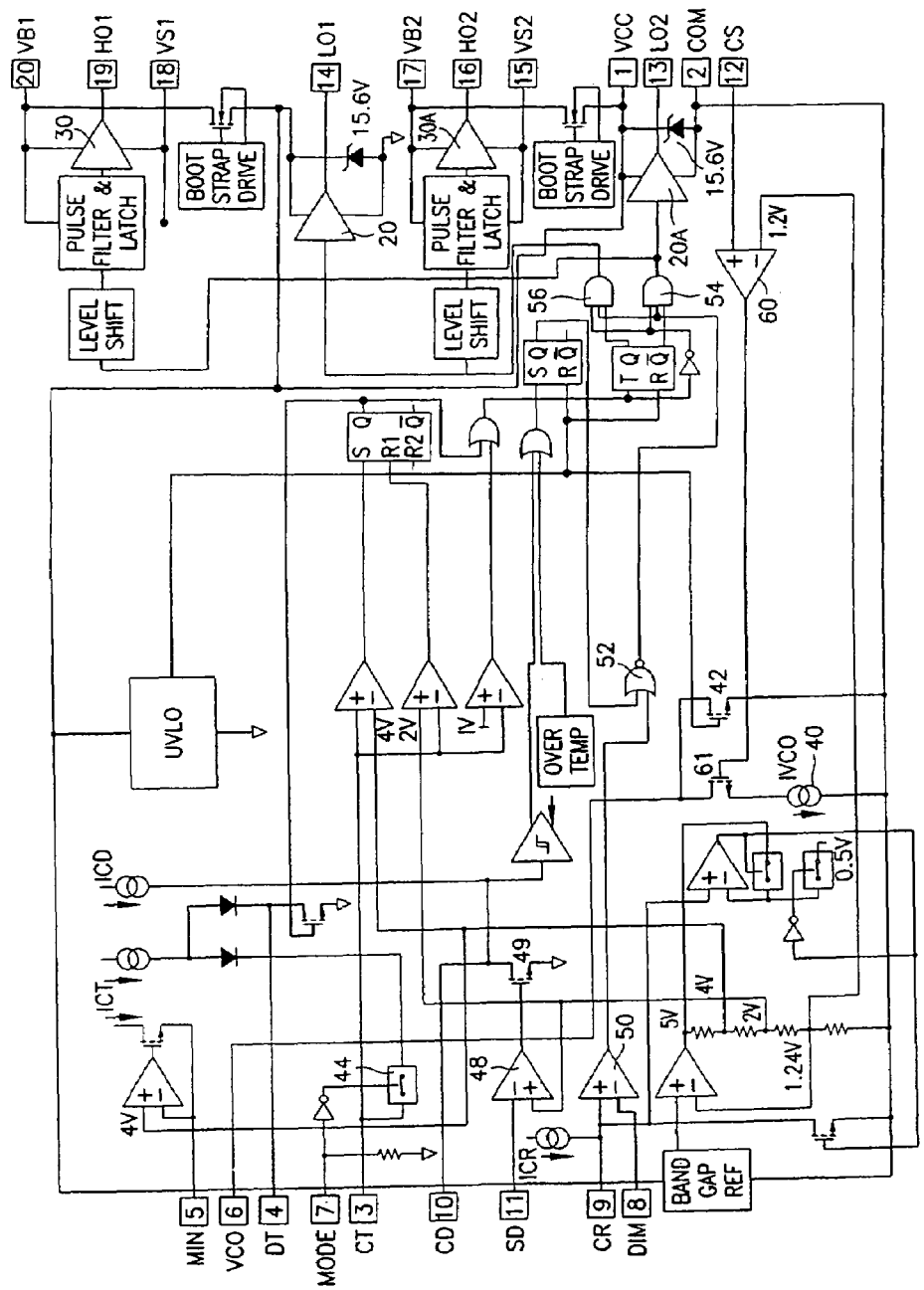
FIG. 10 shows a functional block diagram for the integrated circuit of FIGS. 4 and 5.

FIG. 10 shows the functional block diagram of the integrated circuit of FIGS. 4 and 5. The additional drivers for switches Q4 and Q3 are shown at 30A and 20A, respectively. Like the circuit of FIG. 1, the integrated circuit includes an undervoltage lockout circuit UVLO that remains in micropower mode until the voltage at VCC exceeds the UVLO threshold. When VCC exceeds the UVLO+threshold, the oscillator starts up (transistor 42 holds the VCO off when a UVLO command is issued) and gate drive signals are provided at the LO and HO outputs for the four output transistors, providing the MODE pin is connected to common COM. For a period of approximately 30 microseconds after start up, the LO1 and LO2 outputs will both be high in order to precharge the two bootstrap capacitors CB1 and CB2 before the integrated circuit begins normal operation, in which LO1 and HO2 are on while LO2 and HO1 are off and vice versa.

During UVLO and shut down conditions, the voltage at the VCO terminal is held to COM. This is released at start up allowing CVCO to charge through RMAX from the terminal MIN, which illustratedly sources 4 volts. The oscillator frequency is determined by the VCO input voltage so that it is maximum when VCO is at COM and reduces as the voltage at VCO increases reaching a minimum frequency when VCO is approximately 4 volts. This creates the ignition ramp required to strike the lamps. RMIN sets the minimum oscillator frequency such that the circuit is designed to have a resonant frequency just below this point and the maximum frequency is set by RMAX. As the VCO pin voltage reaches 4 volts and the frequency approaches the resonant frequency of the output circuit, a large voltage is developed at the lamp outputs allowing ignition to take place.

Figure 7:
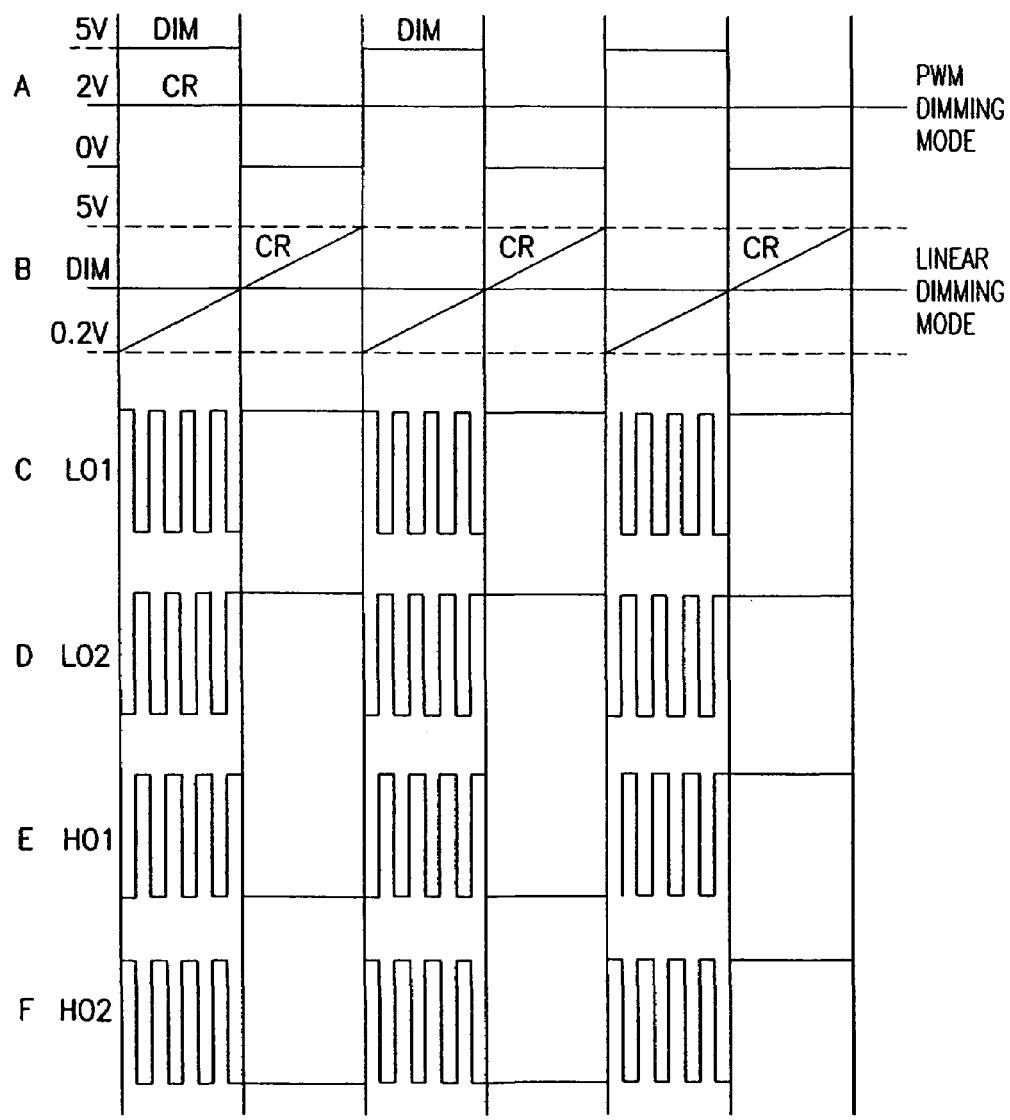
FIG. 7 shows waveforms for explaining the dimming operation of the circuit in two dimming modes.

With reference to FIGS. 4 and 5, the integrated circuit provides a burst dimming functionality. In particular, the integrated circuit supports two dimming modes, a linear dimming mode and a PWM dimming mode. FIG. 7 shows the operation of these two modes. In burst dimming, the output drive to the lamps is pulsed on and off at a low frequency in pulsed bursts. This can be accomplished in two ways; linear dimming mode and PWM dimming mode. FIG. 7B shows the linear mode. The outputs are shown in FIGS. 7C, D, E and F for both modes. In the linear mode, the lamps are pulsed on and off at a low frequency and the duty cycle is adjusted to control the average current and therefore the light output of the lamps. The integrated circuit contains a low frequency oscillator. The low frequency oscillator generates a ramp waveform at the CR pin which varies from 0.2 volts to 5 volts. This is shown in FIG. 7B. The ramp frequency is dependent on the value of the external CR capacitor. See FIGS. 4 and 5. A DC dimming control voltage is fed into the DIM terminal which is compared with the dimming ramp by means of an internal comparator 50. The output of comparator 50 is provided to NOR gate 52, which output is provided to AND gates 54 and 56 to control the drivers. When comparator 50 output is high, corresponding to CR being greater than DIM, gate 52 output will be low and the outputs of AND gates 54 and 56 will then be low, thereby disabling the outputs. An example dimming control signal is shown in FIG. 7B. When the dimming signal is greater than the ramp signal an internal PWM signal is used internally to switch the outputs on and off. Thus, when the dim voltage is at 5 volts, the outputs will be pulse width modulated all of the time and when it is at zero volts, the outputs will be off all the time. FIG. 7B shows a situation where the dim input is approximately midway between 0.2 volts and 5 volts, i.e., approximately 2.5 volts and with this dimming input, the outputs are pulsed approximately half the time in bursts and the other half time the low outputs are high and the high outputs are low, meaning that the lamps are off. This results in a dimmed level of the lamps due to the averaging of the times when the lamps are pulsed in bursts and when the lamps are off. As explained above, if the dim level was maintained at 5 volts, the outputs would be pulsed the entire time. If the dim level were at zero volts, the ramp would always be above the dim level and therefore the outputs would be off all the time, i.e., the lamps would be off.

The integrated circuit also supports a PWM dimming mode as shown in FIG. 7A. In this mode, the CR input as shown in FIG. 7A is provided with a fixed level input, in the illustrated embodiment two volts. Thus, capacitor CR is not connected to the CR input and instead a 2 volt level is provided to the CR input. With such a connection, a PWM dimming control signal can be fed directly to the DIM terminal. A PWM dimming control signal is shown in FIG. 7A labeled DIM. This PWM control signal has a 50% duty cycle. As shown, when the DIM level is off, i.e., at 0 volts, the low outputs are both high to charge the bootstrap capacitors from VB1 to VS1 and VB2 to VS2. During the on period of the PWM dimming control signal of FIG. 7A, the outputs are pulsed on and off in normal fashion. This thus provides a burst dimming functionality.

During the off period of the burst dimming cycle, that is when the CR ramp exceeds DIM, the LO1 and LO2 outputs will both be high in order to maintain full charge on both bootstrap capacitors.

Figure 8:
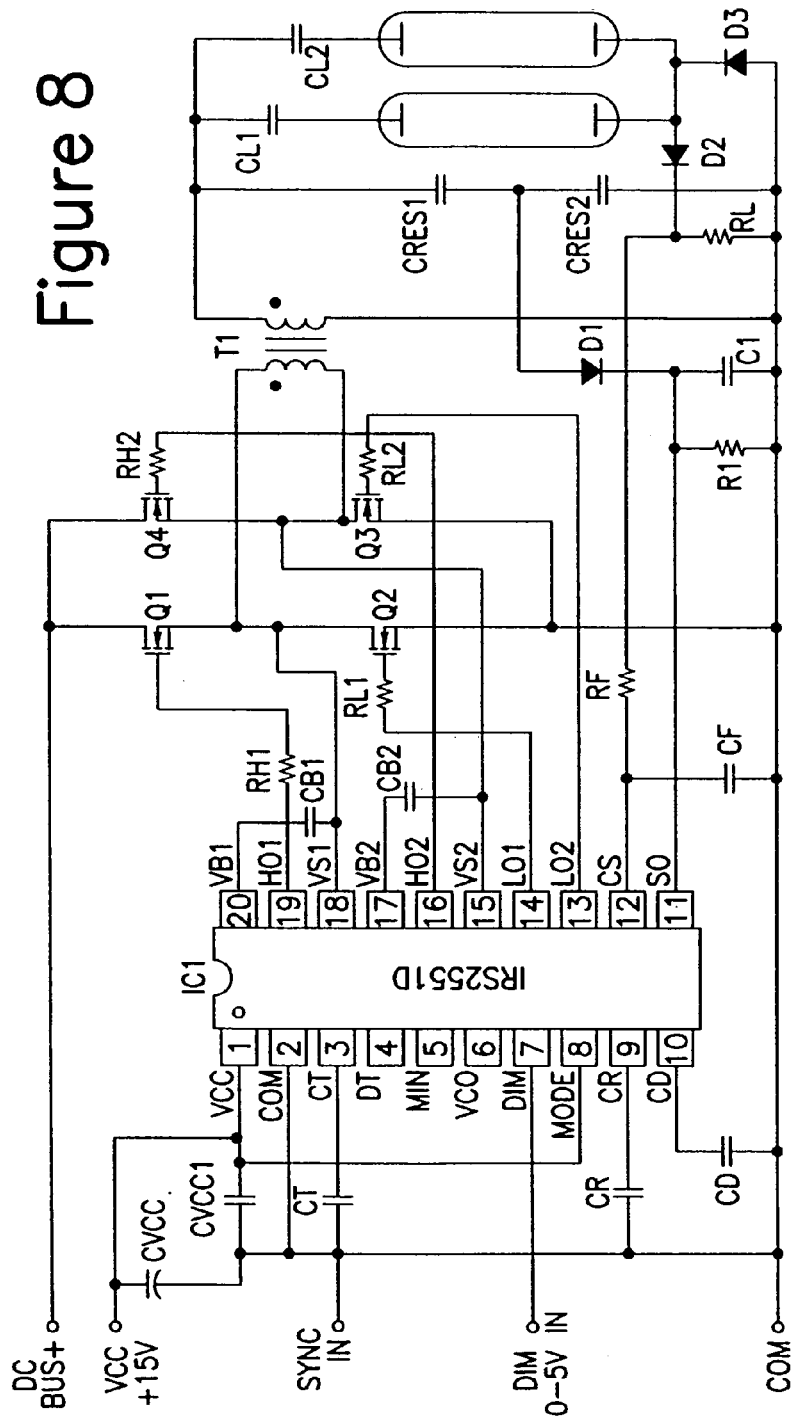
FIG. 8 shows an aspect of the invention which enables slave mode connection of ballasts according to the invention.
Figure 9:
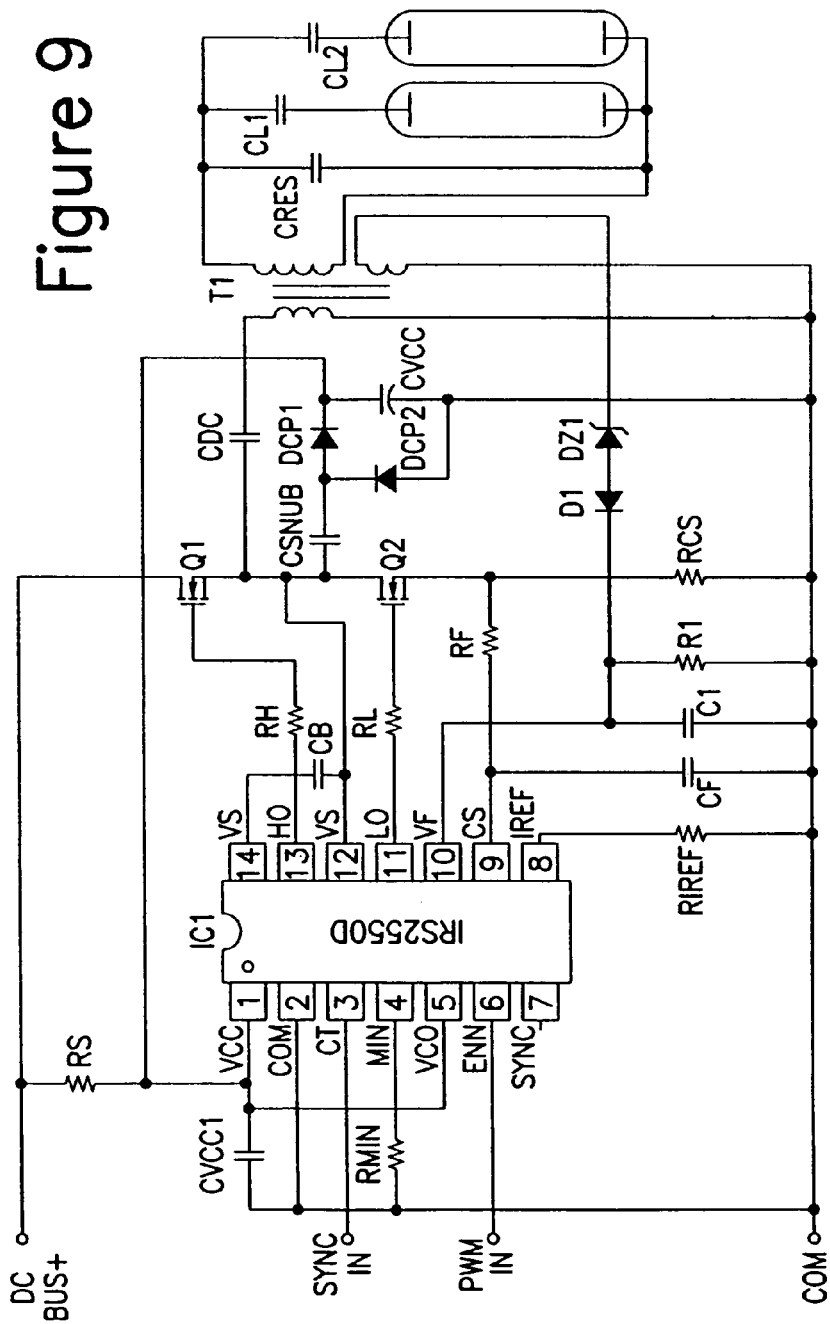
FIG. 9 shows a slave mode connection diagram for another embodiment of the present invention employing a half bridge.

FIGS. 8 and 9 show two further embodiments of the circuit according to the present invention. FIG. 8 shows a circuit employing a full bridge output stage and FIG. 9 shows a half bridge output stage. Further, FIGS. 8 and 9 show the slave mode of operation. In FIG. 8, when the MODE input is connected to VCC as shown, the VCO circuit will be deactivated via switch 44 (see FIG. 10) such that pin CT will be neither charged or discharged through the oscillator of the integrated circuit. In the slave mode, the LO and HO outputs are driven directly from the master. This signal from DT of the master circuit is fed directly to the CT pin (SYNC IN) of the slave, which has no CT capacitor connected as shown in FIG. 8.

With reference to FIG. 9 which shows the half bridge circuit, terminal VCO is again connected to VCC. The VCO circuit will be deactivated such that CT will be neither charged or discharged through the internal current sources of the integrated circuit. In the slave mode, the LO and HO outputs are driven directly from the SYNC output provided from another integrated circuit that is configured as a master. This signal is fed directly to the CT pin of the slave, as shown in FIG. 9. The terminal SYNC provides an output when the IC functions as a master, in which case VCO is not tied to VCC.

In this way, many slave ballast circuits may be connected to one master so that a system comprised of many lamps is able to operate at a frequency and phase locked to each other. The phase may be 180° shifted from the master. However, since the switching transitions are all occurring at the same time this avoids any interference between ballasts that may cause visible instability in the lamps.

CCFL and EEFL lamps need higher voltages to strike when they are cold. It is desirable that during ignition, when overvoltage occurs, the ballasts will still supply the high voltage to the lamp for a certain period of time, typically one second to 1½ seconds, before shut down to protect the ballast and users. Therefore, the present invention integrates a programmable delay latched shut down feature on the SD terminal.

If the output is open circuit i.e., the lamps are disconnected, a very large voltage develops at the output. This is fed back to the SD pin through a sensing network for example, as shown in FIG. 4 via the auxiliary winding A on transistor T1 and the diode D1 as filtered by R1 and C1. In FIG. 5, the feedback voltage is developed between capacitor CRES1 and CRES2 and fed back to rectifier diode D1. Components are selected such that during open circuit conditions, a voltage exceeding a threshold voltage, for example 2 volts, during an overvoltage condition will be generated at the SD pin. This will turn off a transistor 49 coupled to the output of a comparator 48 connected to the SD pin allowing the capacitor CD (see FIGS. 4 and 5) to begin to charge through a current source 51. If the voltage at SD drops below 2 volts, the capacitor CD will be discharged to 0 volts again when the transistor 49 is turned on. If SD remains above 2 volts long enough for the CD capacitor voltage to reach 5 volts, then the integrated circuit will shut down and go into a fault mode. The shut down delay time is programmed by the value of capacitor CD. Thus, if an overvoltage condition persists for longer than the delay time set by capacitor CD, the circuit will be protected from dangerous over-voltage.

According to the invention, lamp power is controlled through feedback from the CS pin. As shown in FIGS. 1, 4 and 5, current in the half bridge is monitored at the CS terminal so that during operation, if too much power is supplied to the lamps, the integrated circuit is able to compensate by increasing the oscillator frequency thereby decreasing the current. In FIG. 1, current is sensed through the resistor RCS. In FIG. 4, current is sensed by a transformer T2 whose output is provided across a sense resistor RCS. In FIG. 5, current is sensed across a resistor RL. Every cycle when the CS terminal voltage exceeds a predetermined threshold, in the illustrated embodiment 1.2 volts, a small amount of current will be drawn from terminal VCO via transistor 61 to decrease the VCO voltage and thus increase the VCO frequency. This is caused by operation of the comparator 60 in FIG. 10 which is coupled to the terminal CS. This is also caused by the operation of the comparator 60 coupled to the terminal CS in the circuit of FIG. 2. The maximum VCO voltage, in the illustrated embodiment of FIG. 10, 4 volts, sets the ballast working at the minimum frequency and the minimum VCO voltage of 0 volts sets the working frequency at a maximum. Thus, when the frequency is increased, the power output will be reduced. This prevents the lamps from being overdriven preventing premature end of life.

Furthermore, the output provided at the DT pin can allow additional ballasts configured in a slave mode to operate from the oscillator of the master ballast allowing the realization of a ballast array capable of driving a large number of lamps. The resistor RDT from pin DT to pin CT sets the dead time.

The frequency of operation and dead time are determined as follows:

$$F_{MIN} = \frac{4}{C_T \cdot (R_{MIN} \cdot 2 \cdot \ln(2) \cdot R_{DT})}$$

where $V_{VCO}$=4V, i.e When the igniton ramp is complete and $R_{MAX}$ has no further effect on the oscillator The maximum frequency at the start of the ignition ramp is given by:

$$F_{MAX} = \frac{2}{\left(\frac{(C_T \cdot R_{MIN} \cdot R_{MAX})}{2 \cdot (R_{MIN} + R_{MAX})} + R_{DT} \cdot C_T \cdot \ln(2)\right)}$$

The ON time of the output drive signals (at LO1, LO2, HO1, and HO2) is given by:

$$T_{ON} = \frac{C_T \cdot R_{MIN}}{2}$$

and the dead time is calculated by:

$$T_{DT} = R_{DT} \cdot C_T \cdot \ln(2)$$

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A ballast control integrated circuit for driving at least one gas discharge lamp comprising:
   a first oscillator circuit for producing a first oscillating signal;
   a driver circuit for driving first and second output transistors connected in a half bridge configuration;
   the driver circuit being provided with pulsed signals derived from said first oscillating signal for generating pulsed drive signals for driving said first and second transistors;
   a dimming control circuit responsive to a dimming input signal to drive said driver circuit such that said driver circuit provides said pulsed drive signals in bursts thereby to dim said lamp in dependence on the level of said dimming input signal, said dimming control circuit comprising a burst control generating circuit for generating a burst control signal to control when said pulsed signals from said first oscillator circuit are provided to said driver circuit thereby to control the duration of said bursts of said pulsed drive signal.

2. A ballast control integrated circuit for driving at least one gas discharge lamp comprising:
   a first oscillator circuit for producing a first oscillating signal;
   a driver circuit for driving first and second output transistors connected in a half bridge configuration;
   the driver circuit being provided with pulsed signals derived from said first oscillating signal for generating pulsed drive signals for driving said first and second transistors;
   a dimming control circuit responsive to a dimming input signal to drive said driver circuit such that said driver circuit provides said pulsed drive signals in bursts thereby to dim said lamp in dependence on the level of said dimming input signal,
   wherein the dimming control circuit comprises a second oscillator circuit for producing a second oscillating signal at a frequency substantially less than the frequency of said first oscillating signal; and
   a comparator circuit for comparing said second oscillating signal to said dimming input and for generating a burst control signal to control when said pulsed signals from said first oscillator circuit are provided to said driver circuit thereby to control the duration of said bursts of said pulsed drive signals.

3. The ballast control integrated circuit of claim 2, wherein said second oscillating signal comprises a ramp signal and said dimming input comprises a variable DC level.

4. The ballast control integrated circuit of claim 3, wherein the frequency of said ramp signal is determined by an external capacitor.

5. The ballast control integrated circuit of claim 2, further wherein said dimming circuit is operable to produce said bursts such that said dimming input receives a pulse width modulated signal having a duty cycle and wherein said second oscillator circuit has an external terminal connectable to an external capacitor and wherein if a fixed DC level is provided to said external terminal, the duration of said bursts of said pulsed drive signals are determined by a relationship of the duty cycle of said pulse width modulated signal to said fixed DC level.

6. The ballast control integrated circuit of claim 5, wherein the bursts are provided during the on period of said pulse width modulated signal.

7. A ballast control integrated circuit for driving at least one gas discharge lamp comprising:
   a first oscillator circuit for producing a first oscillating signal;
   a driver circuit for driving first and second output transistors connected in a half bridge configuration;
   the driver circuit being provided with pulsed signals derived from said first oscillating signal for generating pulsed drive signals for driving said first and second transistors; and
   a dimming control circuit responsive to a dimming input signal to drive said driver circuit such that said driver circuit provides said pulsed drive signals in bursts thereby to dim said lamp in dependence on the level of said dimming input signal,
   wherein the driver circuit further drives third and fourth transistors connected in a second half bridge configuration, whereby the first, second, third and fourth transistors are connected in a full bridge configuration.

8. A ballast control integrated circuit for driving at least one gas discharge lamp comprising:
   a first oscillator circuit for producing a first oscillating signal;
   a driver circuit for driving first and second output transistors connected in a half bridge configuration;

the driver circuit being provided with pulsed signals derived from said first oscillating signal for generating pulsed drive signals for driving said first and second transistors; and a dimming control circuit responsive to a dimming input signal to drive said driver circuit such that said driver circuit provides said pulsed drive signals in bursts thereby to dim said lamp in dependence on the level of said dimming input signal, further comprising at least one bootstrap capacitor coupled to a switched node between said first and second transistors, and wherein said one of said first and second transistors functioning as a low side transistor is turned on during the off period between bursts to insure charging of said bootstrap capacitor.

9. A ballast control integrated circuit of a first ballast circuit for driving at least one gas discharge lamp comprising:

a first oscillator circuit for producing a first oscillating signal;

a driver circuit for driving first and second output transistors connected in a half bridge configuration;

the driver circuit being provided with pulsed signals derived from said first oscillating signal for generating pulsed drive signals for driving said first and second output transistors; and a mode input responsive to a mode signal for determining if said integrated circuit operates as a master or a slave circuit whereby, in a first mode, said first oscillator circuit is activated and produces said first oscillating signal for driving said driver circuit and produces an output signal capable of driving at least one other ballast circuit such that output transistor switching transitions in the at least one other ballast circuit are synchronized with output transistor switching transitions of the first ballast circuit, and, whereby in a second mode, said first ballast circuit operates as a slave, whereby the first oscillator circuit is deactivated and said driver circuit is responsive to an oscillating signal from another ballast circuit such that the output transistor switching transitions of said first ballast circuit are synchronized with the output transistor switching transitions of said other ballast circuit.

10. The ballast control integrated circuit of claim 9, wherein the output transistor switching transitions of the first and other ballast circuit are synchronized in phase or synchronized 180° out of phase.

11. The ballast control integrated circuit of claim 9, wherein the driver circuit further drives third and fourth transistors connected in a second half bridge configuration, whereby the first, second, third and fourth transistors are connected in a full bridge configuration.

12. A ballast control integrated circuit for driving at least one gas discharge lamp comprising:

a first oscillator circuit for producing a first oscillating signal;

a driver circuit for driving first and second output transistors connected in a half bridge configuration;

the driver circuit being provided with pulsed signals derived from said first oscillating signal for generating pulsed drive signals for driving said first and second transistors;

further comprising a shut down circuit responsive to a voltage feedback signal from an output circuit comprising said at least one lamp, the feedback voltage being related to a voltage across said at least one lamp, and wherein, if said voltage exceeds a threshold, said shutdown circuit disables said driver circuit from providing said pulsed drive signals, further comprising a timing circuit responsive to said voltage feedback signal whereby said voltage must exceed said threshold for a predetermined time in order to disable said driver circuit from providing said pulsed drive signals.

13. The ballast control integrated circuit of claim 12, wherein said shut down circuit comprises a shut down input receiving said voltage feedback signal, said shut down input being provided to a first input of a comparator having a second input coupled to a reference voltage and providing an output based on a comparison to said reference voltage, further comprising a switch controlled by said comparator output, the switch being coupled to a timing capacitor and allowing said capacitor to charge when the feedback voltage indicates a voltage above said threshold, and wherein said capacitor must charge above a predefined level in order to disable said driver circuit.

14. The ballast control integrated circuit of claim 13, wherein if said shut down input remains below a level whereby said voltages below said threshold, said switch maintains said timing capacitor in a state of discharge such that said driver circuit remains enabled to produce said pulsed drive signals.

15. The ballast control integrated circuit of claim 12, wherein the driver circuit further drives third and fourth transistors connected in a second half bridge configuration, whereby the first, second, third and fourth transistors are connected in a full bridge configuration.

16. A ballast control integrated circuit for driving at least one gas discharge lamp comprising:

a first oscillator circuit for producing a first oscillating signal;

a driver circuit for driving first and second output transistors connected in a half bridge configuration and driving a lamp output circuit including said at least one gas discharge lamp;

the driver circuit being provided with pulsed signals derived from said first oscillating signal for generating pulsed drive signals for driving said first and second transistors;

further comprising a current sense input whereby if a voltage at the current sense input developed from a current in the lamp output circuit exceeds a threshold, the frequency of said first oscillator circuit is increased to increase the frequency of said pulsed drive signals thereby to reduce the power provided to said lamp output circuit.

17. The ballast control integrated circuit of claim 16, wherein said first oscillator circuit comprises a voltage controlled oscillator having a VCO input wherein a voltage is provided to control the oscillator frequency, and wherein said current sense input is coupled to a current sense comparison circuit for drawing current from said VCO input to reduce the VCO input voltage and thereby increase the frequency of oscillation.

18. The ballast control integrated circuit of claim 16, wherein said current sense comparison circuit comprises a comparator having a first input coupled to said current sense input and a second input coupled to a reference voltage, and whereby said comparator has an output coupled to a switch, said switch being controlled by said comparator output to decrease said VCO input voltage to increase said frequency of oscillation.

19. The ballast control integrated circuit of claim 16, wherein the driver circuit further drives third and fourth transistors connected in a second half bridge configuration, whereby the first, second, third and fourth transistors are connected in a full bridge configuration.

* * * * *